United States Patent

Stone

Patent Number: 5,137,644
Date of Patent: Aug. 11, 1992

[54] PIPE CONNECTION SYSTEM FOR MULTIPLE WATER TREATMENT FILTERS

[75] Inventor: Brian G. Stone, LaFayette, Calif.

[73] Assignee: James M. Montgomery Consulting Engineers, Inc., Pasadena, Calif.

[21] Appl. No.: 699,682

[22] Filed: May 14, 1991

[51] Int. Cl.$^5$ .............................................. B01D 41/00
[52] U.S. Cl. .................................. 210/791; 210/136; 210/143; 210/333.01; 210/341; 210/427
[58] Field of Search ............... 210/136, 143, 340, 341, 210/257.1, 333.01, 411, 427, 791, 793–798

[56] References Cited

U.S. PATENT DOCUMENTS

| | | | |
|---|---|---|---|
| 805,374 | 11/1905 | McDonald | 210/341 |
| 3,012,156 | 12/1961 | Simmons | 210/340 |
| 3,056,499 | 10/1952 | Liddell | 210/340 |
| 3,121,681 | 2/1964 | Baxter | 210/340 |
| 4,162,973 | 7/1979 | Lynch | 210/341 |

OTHER PUBLICATIONS

Publication by Toshiba Review. Issue No. 133, May–Jun. 1981, "Instrumentation and Automation Systems for Waterworks", pp. 5–13, Kawabe et al.

Primary Examiner—Robert A. Dawson
Assistant Examiner—Joseph Drodge
Attorney, Agent, or Firm—Christie, Parker & Hale

[57] ABSTRACT

A backwash and ripening pipe connection system for a water treatment plant uses common pipelines to and from respective filters in the plant. The backwash/ripening pipeline to and from each filter has an associated valve and connects to one pipeline from a backwash fluid source, and another pipeline leading to a waste storage tank. The filters also connect through separate pipelines to a clearwell. The pipeline from the backwash fluid source and the pipeline to the waste storage tank each have an associated master valve. During backwashing, fluid flows through the backwash pipeline to the individual backwash/ripening pipeline and its associated filter, the backwash master valve being open and the ripening master valve being closed. Individual valves on each backwash/ripening pipeline are open. During ripening, waste water from the filters flows through the backwash/ripening pipelines to the pipeline leading to the waste storage tank, the backwash master valve being closed, or blocked by a check valve, and the ripening master valve being open.

15 Claims, 3 Drawing Sheets

PIPE CONNECTION SYSTEM FOR MULTIPLE WATER TREATMENT FILTERS

FIELD OF THE INVENTION

The present invention relates to water treatment filtration plants. More specifically, the invention is a pipe connection system for connecting multiple water treatment filters in a water treatment plant such that common pipelines are used for backwash and waste water storage tanks.

BACKGROUND

In a water treatment plant, multiple filters are used to purify water. Every so often, these filters must be "backwashed" which involves stopping the flow of water and sending backwash fluid in a reverse direction through the filters. After backwashing, there is a period of time, known as "ripening," during which water passing through the filters will require further treatment before being ready for consumers. Typically, public health authorities mandate an appropriate ripening period.

A typical filtration system for a water treatment plant is shown schematically in FIG. 1, with arrows indicating the direction in which fluid flow takes place, and with cross-fittings and T-fittings that are not specifically shown being represented by black dots as appropriate at all pipe junctions. In the plant, there are multiple filters 1, 2, 3 containing granular filter media 11, 12, 13, respectively. Water enters through pipes 21, 22, 23, which have valves 31, 32, 33 in their open position, and purified water exits through pipes 41, 42, 43, respectively, with valves 51, 52, 53 open, and valves 61, 62, 63 and 71, 72, 73 shut. The purified water passes through cross-fittings 81, 82, 83 and pipes 91, 92, 93 to a common pipe 95 leading to a clearwell 96. During the filtration process, valves 101, 102, 103 on pipes 111, 112, 113 are closed.

When backwashing is required, the plant operator stops flow by closing valves 31, 32, 33 and valves 51, 52, 53. Valves 61, 62, 63 and 101, 102, 103, as well as a master valve 124, are open so that backwash occurs through common pipe 125 from backwash fluid source 126. Flow continues through pipes 131, 132, 133 and up through the filter media and out through pipes 111, 112, 113 to a waste backwash storage tank. Valve 124 is typically kept open, except for maintenance purposes. Valve 124 regulates the flow of the backwash fluid to all filters in the system. The backwash fluid source 126 usually consists of water already treated by the filter plant, and may even come from clearwell 96.

For ripening, valves 31, 32, 33 and 71, 72, 73 are open so that water flows through pipes 141, 142, 143 to common pipe 145 to a waste storage tank 146. This waste water will ultimately be retreated by the filter system.

As can readily be seen from FIG. 1, numerous valves and pipes exist in the system. Conventional wisdom teaches that all of these valves and pipes are necessary to individually backwash and to independently individually ripen filters. The backwash water requirements are kept small this way, and pipe diameters are also kept small. Moreover, the duration of time that ripening and backwashing occurs can be kept to a minimum, as these operations can be tailored to the specific requirements of each filter. Some filters may need backwashing and ripening more often than others. Although the conventional system precludes the simultaneous backwashing of filters, it does allow a filter to be backwashed while others may be ripening.

SUMMARY OF THE INVENTION

The invention is an improved backwash and ripening pipe connection system which reduces the number of pipes and valves in a water treatment system.

In one embodiment, the filter system contains multiple filters, each connected to an inlet water pipe and an outlet pipe for carrying filtered water. Each outlet pipe connects to two pipes, one leading to a common pipe for backwash and waste water, and the other leading to another common pipe for filtered water passing to a clearwell. Thus, the same pipes that carry the backwash water to the filters also carry waste water from the filters. This is made possible by providing master valves for both the backwash water source and waste storage tank.

DETAILED DESCRIPTION OF THE PREFERRED EMBODIMENT

Figure 1:
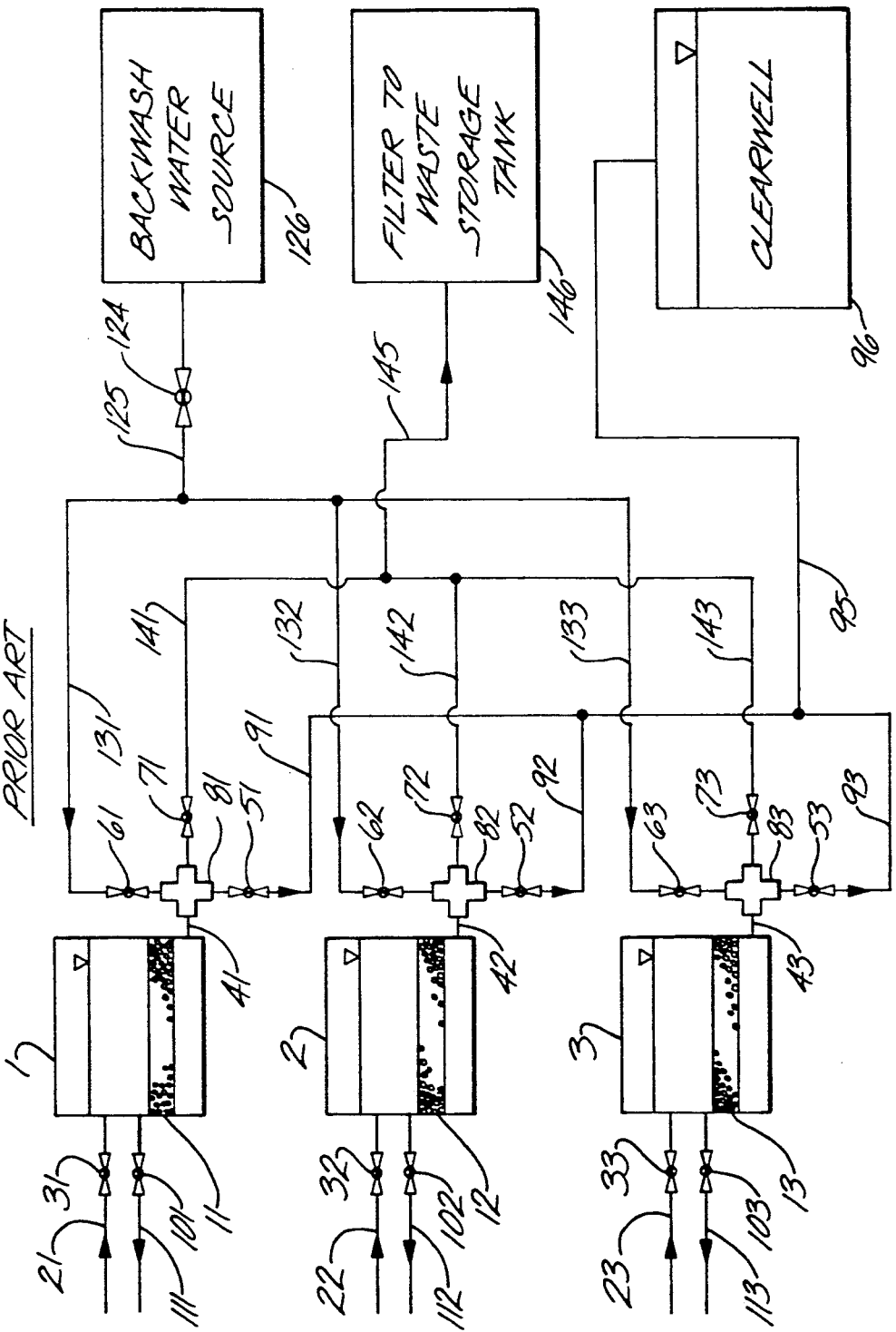
FIG. 1 is a schematic diagram of a conventional filter system for a water treatment plant.
Figure 2:
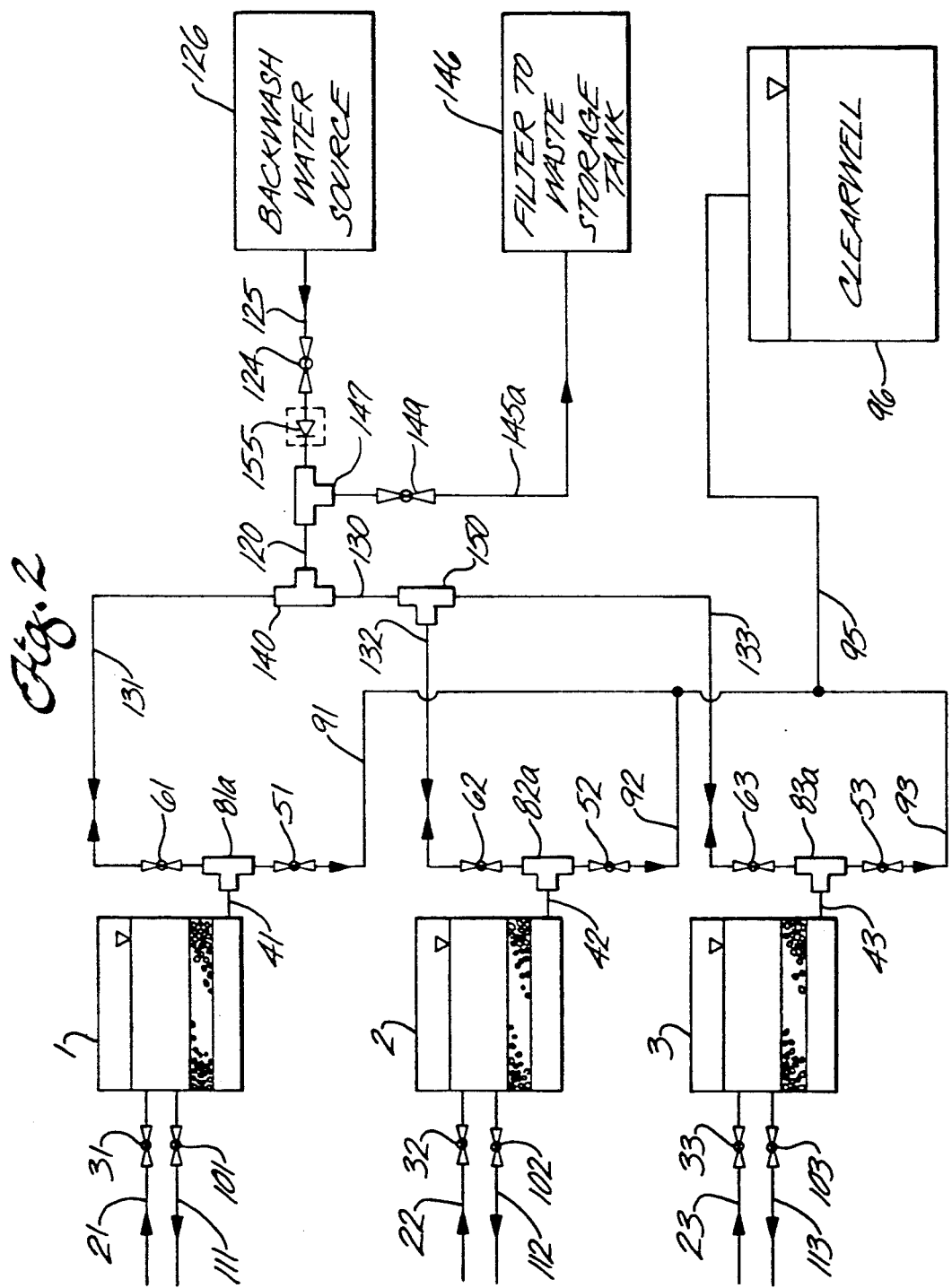
FIG. 2 is a schematic diagram of a filter system according to the invention.

A filter system according to the present invention is shown in FIG. 2, in which like reference numerals with those in FIG. 1 represent like elements. FIG. 2 is somewhat similar to the conventional system described above, except that the filter to waste pipes 141, 142, 143 and respective on/off valves 71, 72, 73 have been replaced by connecting a waste common pipe 145a via a T-fitting 147 to the backwash common pipe 125, and putting a master valve 149 on pipe 145a. In addition, cross-fittings 81, 82, 83 are replaced by T-fittings 81a, 82a, 83a. The T-fitting 147, pipelines 120, 130, and T-fittings 140, 150 constitute means for connecting the pipelines 131, 132, 133 to the pipes 125, 145a. That is, the pipes 131, 132, 133, and 41, 42, 43, or flow paths, each carry waste water to a common junction, formed by T-fitting 140, common pipe 120, and T-fitting 147, in this embodiment, and also carry backwash fluid from this common junction along pipes 131, 132, 133 and 41, 42, 43 to each filter.

The invention was spurred by the recognition not only that backwashing and ripening cannot take place at the same time for any individual filter, but that it is possible to design a practical water treatment plant in which no filter can be ripening while another is being backwashed. In this case, the filter to waste pipes can be removed by connecting the waste tank to the backwash pipes and providing a master valve 149 to enable bidirectional flow (at different times) through the backwash pipes 131, 132, 133.

The backwash and ripening systems are thus controlled as follows. To backwash, the entrance valves 31, 32, 33, clearwell valves 51, 52, 53, and waste master valve 149 are all closed. The backwash master valve 124 is modulated or fully open, as required, and the backwash valves 61, 62, 63 and valves 101, 102, 103 are open. If only individual filters 1, 2, 3 are backwashed, then only the associated ones of valves 61, 62, 63 and 101, 102, 103 are open.

To ripen, backwash master valve 124, clearwell valves 51, 52, 53, and valves 101, 102, 103 are closed. Waste master valve 149, valves 61, 62, 63 and entrance valves 31, 32, 33 are open. If only individual filters are ripened, then only the associated ones of valves 61, 62, 63 and 31, 32, 33 are open.

The system of FIG. 2 may be modified by providing a check valve 155 on pipe 125 between T-fitting 147 and valve 124 to avoid the possibility of backflow during ripening where valve 124 is left open.

Figure 3:
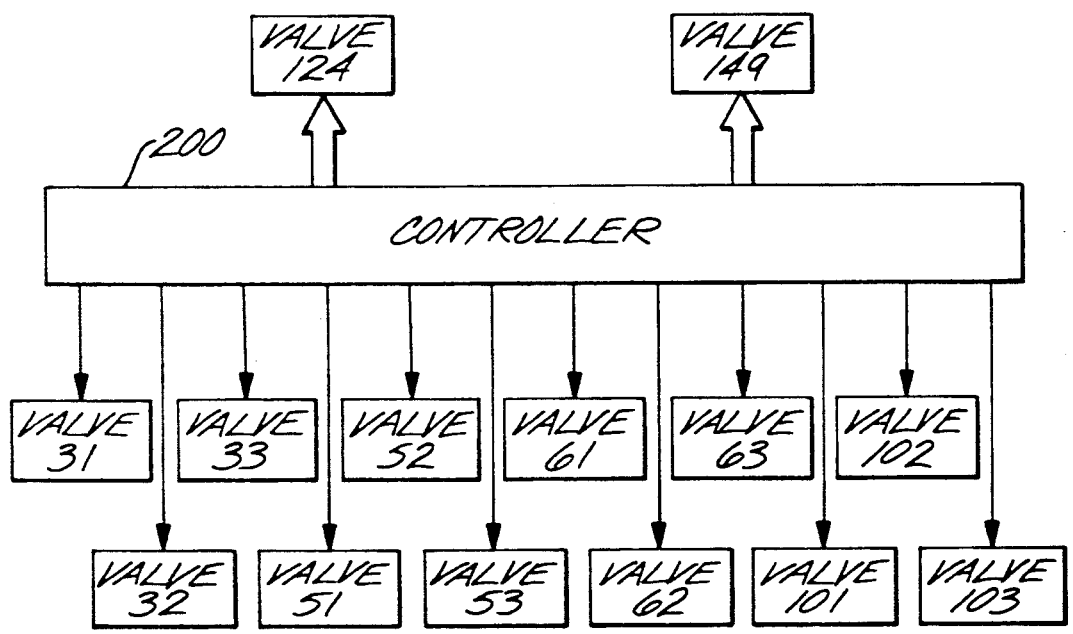
FIG. 3 is a schematic diagram of a valve control system for the invention.

Suitable valves for the master valves 124, 149 are modulating valves. These two master valves, as well as the other valves in the system, are preferably electronically controlled by a controller 200, as shown schematically in FIG. 3.

The inventive pipe arrangement for the filter system affords substantial savings in plant construction costs by eliminating piping and valves.

The invention is defined by the claims, and is not limited to the embodiment described above as numerous variations incorporating the inventive concept will be evident to those of ordinary skill.

What is claimed is:

1. A system connecting a plurality of filters in a water treatment plant with a backwash fluid source and a waste storage tank, the system comprising:
   (a) a plurality of first flow paths between each respective filter and a common junction of each first flow path;
   (b) a second flow path between the common junction and a source of backwash fluid for carrying backwash fluid from the source through the common junction and to each first flow path leading to each filter;
   (c) a third flow path between the common junction and a tank means for storing waste water resulting from backwashing of the filters, wherein the third flow path is adapted for carrying fluid which has flowed from each filter through each first flow path to the common junction to the tank means;
   (d) a plurality of first means disposed along the first flow paths, respectively, for controlling flow therethrough;
   (e) a second means disposed along the second flow path for controlling flow therethrough;
   (f) a third means disposed along the third flow path for controlling flow therethrough; and
   (g) control means for selectively controlling each of the first means, and the second and third means to enable flow from the source of backwash fluid through the second flow path through the common junction, then through selected ones of the first flow paths to respective ones of the filters, and to enable flow from selected ones of the filters through respective ones of the first flow paths through the common junction to the third flow path and to the tank means.

2. The system of claim 1 wherein the control means controls the third means to prevent flow through the third flow path when the first and second means enable flow, and controls the second means to prevent flow through the second flow path when the first and third means enable flow.

3. The system of claim 1 wherein each of the first means comprises a valve, and the second and third means each comprise a valve.

4. The system of claim 1 wherein the second and third means each comprise modulating valves, and each of the first means comprises a valve.

5. The system of claim 1 further comprising a check valve disposed between the common junction and the second means for preventing flow to the source of backwash fluid.

6. In a water treatment plant comprising a plurality of water filters for filtering water, a clearwell for receiving filtered water, a source of backwash fluid for backwashing the filters, a tank means for receiving waste water from the filters during a ripening period following backwashing and prior to filtering, and means for interconnecting the filters, clearwell, source of backwash fluid and tank means, the improvement wherein the means for interconnecting comprises:
   (a) a plurality of first flow paths between each respective filter and a common junction of each first flow path;
   (b) a second flow path between the common junction and the source of backwash fluid for carrying backwash fluid from the source through the common junction and to each first flow path leading to each filter;
   (c) a third flow path between the common junction and a tank means for storing waste water resulting from ripening of the filters, wherein the third flow path is adapted for carrying fluid which has flowed from each filter through each first flow path to the common junction to the tank means;
   (d) a plurality of first means disposed along the first flow paths, respectively, for controlling flow therethrough;
   (e) a second means disposed along the second flow path for controlling flow therethrough;
   (f) a third means disposed along the third flow path for controlling flow therethrough;
   (g) control means for selectively controlling each of the first means, and the second and third means to enable flow from the source of backwash fluid through the second flow path through the common junction, then through selected ones of the first flow paths to respective ones of the filters, and to enable flow from selected ones of the filters through corresponding ones of the first flow paths, through the common junction, and through the third flow path and to the tank means;
   (h) fourth flow paths for connecting each filter with the clearwell; and
   (i) a plurality of fourth means associated with the fourth flow paths, respectively, for controlling flow therethrough, wherein the control means further comprises means for closing selected ones of the fourth means during backwashing and ripening, and opening the selected ones of the fourth means during filtering of the water.

7. The system of claim 6 wherein the control means control the third means to prevent flow through the third flow path when the first and second means enable flow, and controls the second means to prevent flow through the second flow path when the first and third means enable flow.

8. The system of claim 6 wherein each of the first means comprises a valve, and the second and third means each comprise a valve.

9. The system of claim 6 wherein the second and third means each comprise modulating valves, and each of the first means comprises a valve.

10. The system of claim 6 further comprising a check valve disposed between the common junction and the second means for preventing flow to the source of backwash water.

11. A method of backwashing and ripening a plurality of filters in a water treatment plant, the plant having a plurality of water filters, a clearwell for receiving filtered water during filtering, a source of backwash fluid for backwashing the filters, a tank means for receiving waste water from the filters during a ripening period following backwashing and before filtering, and means for interconnecting the filters, clearwell, source of backwash fluid and tank means, the means for interconnecting comprising:

(a) a plurality of first flow paths between each respective filter and a common junction of each first flow path;

(b) a second flow path between the common junction and a source of backwash fluid for carrying backwash fluid from the source through the common junction and to each first flow path leading to each filter;

(c) a third flow path between the common junction and a tank means for storing waste water resulting from backwashing of the filters, wherein the third flow path is adapted for carrying fluid which has flowed from each filter through each first flow path to the common junction to the tank means;

(d) a plurality of first valves disposed along the first flow paths, respectively, for controlling flow therethrough;

(e) a second valve disposed along the second flow path for controlling flow therethrough;

(f) a third valve disposed along the third flow path for controlling flow therethrough;

(g) a plurality of fourth flow paths for connecting each filter, respectively, with the clearwell, a plurality of fifth flow paths for carrying water to be filtered to the respective filters, and a plurality of sixth flow paths for carrying backwash fluid out of the filters; and (h) a fourth, fifth, and sixth valve associated with each fourth, fifth, and sixth flow path, respectively, for controlling flow therethrough;

wherein the method the comprises the steps of:

backwashing the filters by opening selected ones of the first valves, each corresponding sixth valve, and the second valve, and by closing the third valve, and each corresponding fourth valve and fifth valve, and by flowing backwash fluid from the source of backwash fluid through the second flow path, through the common junction to the first flow paths corresponding to the selected filters, and to the selected filters, and ripening the filters by opening the selected ones of the first valves, the third valve, and each corresponding fifth valve, and closing each corresponding fourth valve and sixth valve, and preventing flow through the second valve, and by flowing waste water from the filters corresponding to the first flow paths corresponding to the selected ones of the first valves, to the common junction, to the third flow path, and to the tank means.

12. The method of claim 11 further comprising the step of filtering water by opening each fifth valve and fourth valve, and closing the first valves.

13. The method of claim 11 wherein the step of preventing flow through the second valve comprises a step of closing the second valve.

14. The method of claim 11 wherein the step of preventing flow through the second valve comprises a step of using a check valve disposed between the common junction and the second valve to prevent flow from the common junction to the second valve.

15. The method of claim 11 wherein during ripening, water is flowed through selected ones of the filters, the corresponding first flow paths, common junction, and third flow path away from the filters, and during backwashing, backwash fluid is flowed through the second flow path, common junction, and selected ones of the first flow paths to the corresponding filters.

* * * * *

UNITED STATES PATENT AND TRADEMARK OFFICE
CERTIFICATE OF CORRECTION

PATENT NO.    : 5,137,644
DATED         : August 11, 1992
INVENTOR(S)   : Brian G. Stone It is certified that error appears in the above-identified patent and that said Letters Patent is hereby corrected as shown below:

On the Title page: item

[56] References Cited, U.S. PATENT DOCUMENTS,
    change "3,056,499  10/1952  Liddell" to
    -- 3,056,499  10/1962  Liddell --.

[56] References Cited, U.S. PATENT DOCUMENTS, add the
    following references:

--  1,870,321   8/09/32   Adelson.........210/341
        2,679,319   5/25/54   Walker..........210/130
        3,716,139   2/13/73   Turner..........210/104
        3,792,773   2/19/74   Ross............210/42
        4,187,175   2/05/80   Roberts et al...210/80 --.

Signed and Sealed this

Nineteenth Day of October, 1993

Attest:

BRUCE LEHMAN

Attesting Officer

Commissioner of Patents and Trademarks